Nov. 20, 1956 M. FAVRET 2,770,942
HOROLOGICAL BALANCE WITH ADJUSTABLE MOMENT OF INERTIA
Filed March 3, 1953 3 Sheets-Sheet 1
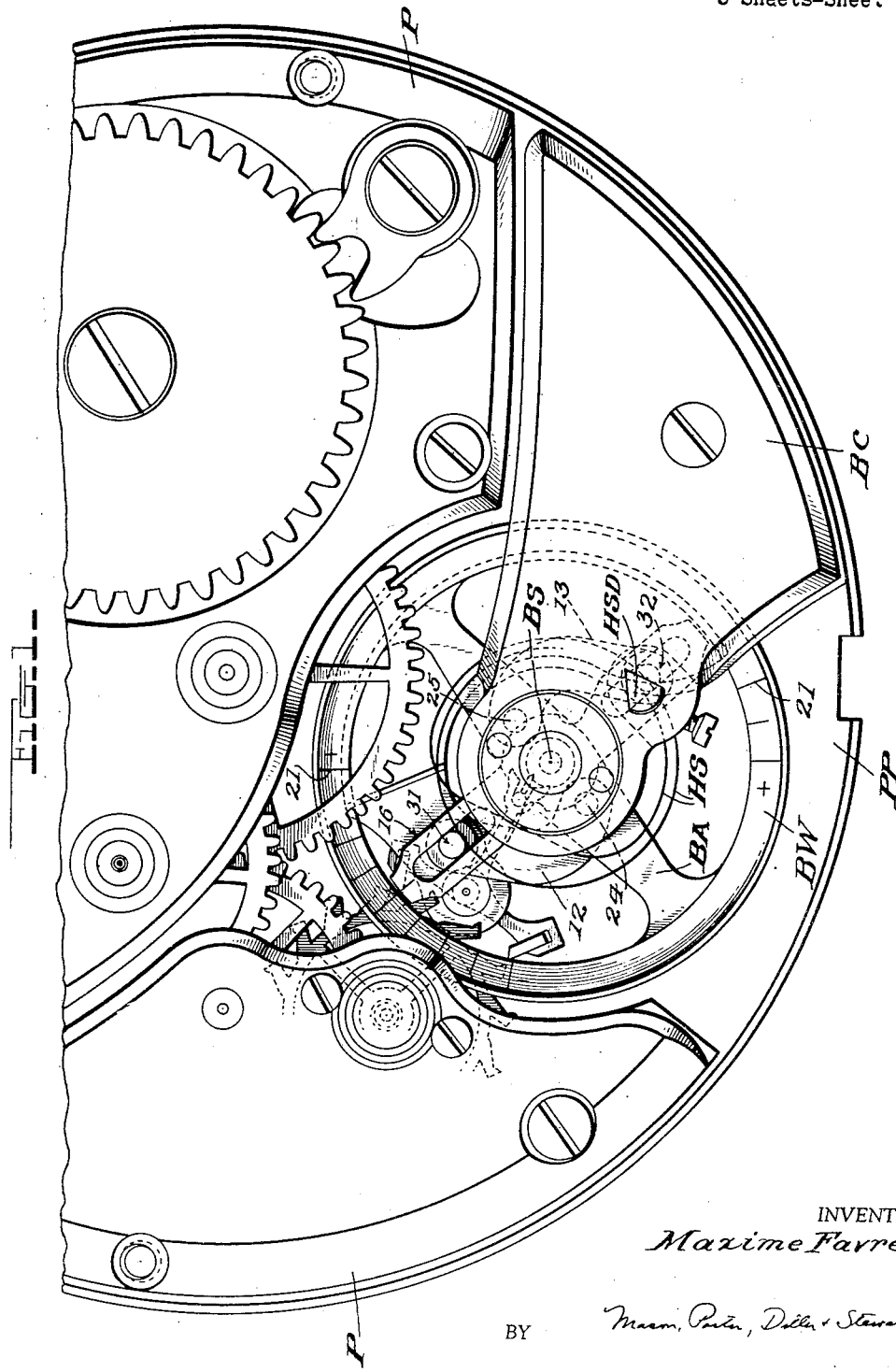
INVENTOR
Maxime Favret
BY
ATTORNEYS Nov. 20, 1956 M. FAVRET 2,770,942
HOROLOGICAL BALANCE WITH ADJUSTABLE MOMENT OF INERTIA
Filed March 3, 1953 3 Sheets-Sheet 2
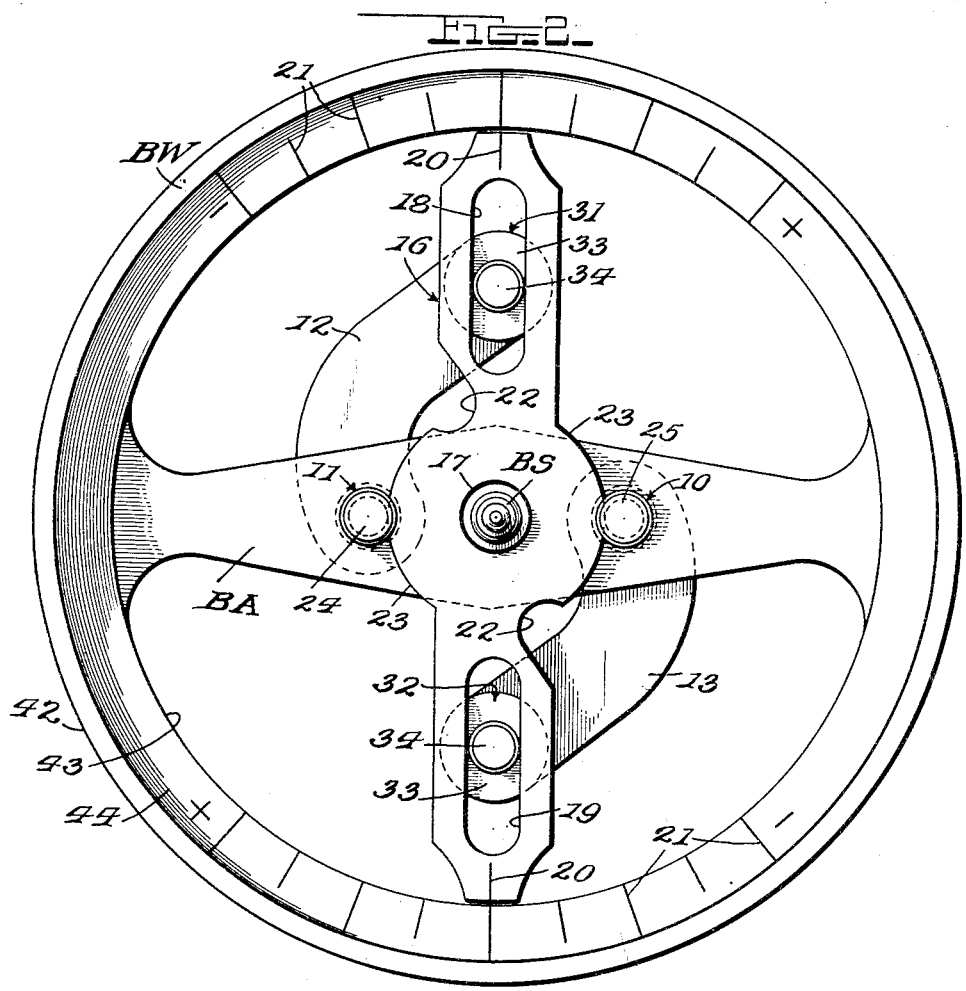
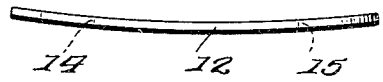
INVENTOR
Maxime Favret
BY
ATTORNEYS Nov. 20, 1956  M. FAVRET  2,770,942
HOROLOGICAL BALANCE WITH ADJUSTABLE MOMENT OF INERTIA
Filed March 3, 1953  3 Sheets-Sheet 3
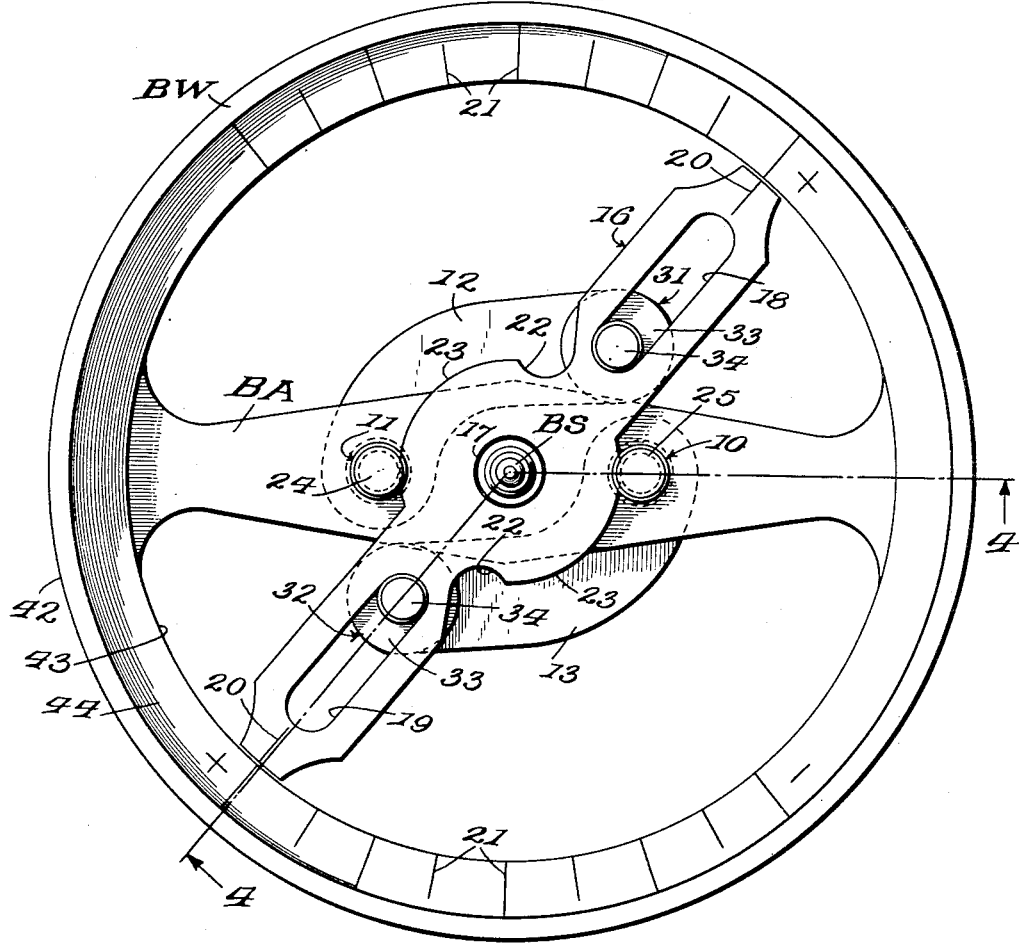
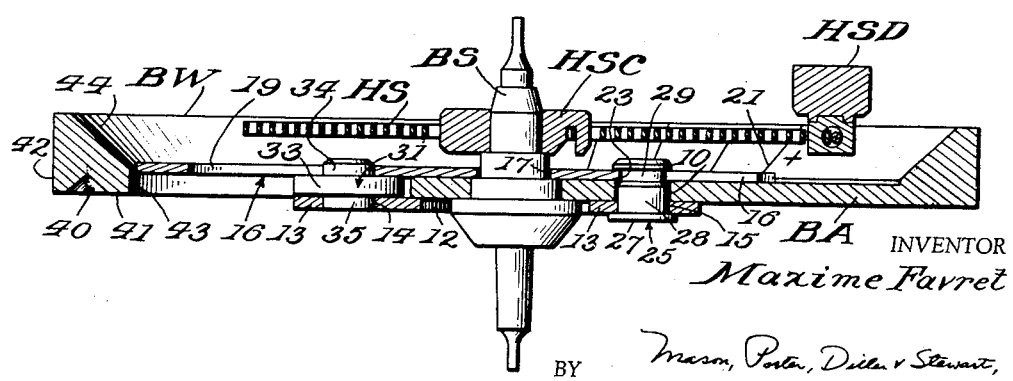
INVENTOR
*Maxime Favret*
BY *Mason, Porter, Diller & Stewart,*
ATTORNEYS

United States Patent Office 2,770,942
Patented Nov. 20, 1956

2,770,942
HOROLOGICAL BALANCE WITH ADJUSTABLE MOMENT OF INERTIA

Maxime Favret, Elgin Ill., assignor to Elgin National Watch Company, Elgin, Ill., a corporation of Illinois Application March 3, 1953, Serial No. 340,111

8 Claims. (Cl. 58—107)

This invention relates to a horological balance having thereon adjustable masses whereby the radius of gyration and therewith the moment of inertia may be regulated for determining the rate of the balance when employed with an energy storage and releasing member such as the usual hairspring.

Present commercial watches, alarm clocks, and like horological instruments employ rate-controlling assemblies of a balance and a hairspring, and the rate may be modified by moving a regulator lever which is pivoted on the frame, e. g. on the balance cock and which customarily has a part which engages the hairspring at different points so that the rate is varied in accordance with the effective length of the hairspring between the regulator attachment (e. g. regulator pins) and the collet attachment on the balance staff. That is, the rate is controlled by varying the hairspring.

Such a regulation for the hairspring has serious disadvantages: for example, a regulating change thereof introduces an isochronal error particularly when regulator pins are used which are loose relative to the hairspring. When the pins are tight upon the hairspring, it is necessary to loosen the engagement for each adjustment operation; either manually, or by some automatic device which demands additional parts in the structure. Such regulators, in general, require exact adjustment of the hairspring at the regulator engagement, over the entire portion of the hairspring which may be contacted over the range of adjustment. Above all, the effective length of the hairspring is no longer that from the stud to the collet, and hence "end turn" or Breguet hairsprings are not employable with full effect.

It has also been a practice to employ controllable masses upon the balance wheel, such as the tightly fitted "meantime screws" which extend radially relative to the balance axis and are rotated for accomplishing fine adjustment of the time rate by shift of the moment of inertia. Such structures are expensive to manufacture and to adjust; after usage the screws tend to become loose and no longer maintain their position in service; and each screw must be independently adjusted, but diametrically opposite pairs must be moved with each step of adjustment in order to maintain the poise of the balance, and this poise can easily be lost by maladjustment. Eccentric washers mounted on the balance wheel for rotation about axes parallel to the balance axis have similarly been employed, but with the same troubles and objections.

According to the present invention, the hairspring can be kept essentially invariable mechanically, and the rate is controlled by varying the moment of inertia of the balance. Therewith is attained a structure fulfilling the need for a fine adjustment for time rate, permitting ease and quickness of adjustment, manufacturing and assembling simplicity at low cost, and permitting adjustment of time rate without change of poise at any stage of adjustment. Further it permits construction of a balance having a stiffer and sturdier balance rim, as no meantime screw holes are required and therewith material can be removed at any desired or necessary point for bringing the balance into poise; together with the advantage of low cost of manufacture and assembly because of the absence of such screws. The absence of the screw holes means that the material is better distributed with a maximum at the periphery, whereby the ratio of the moment of inertia to the total mass of the balance system is better.

A feature of the invention is the provision of a balance having equal movable masses disposed diametrically opposite one another across the balance axis, and means are provided for concurrently moving the masses so that a change of the moment of inertia can be accomplished without varying the poise of the balance system.

Another feature is the provision of movable levers on the balance which are coupled for concurrent movement, and masses are movably carried by the levers.

A further feature is the provision of a balance having a diametrical spoke or arm on which are mounted two levers at diametrically opposed pivot points, a regulator lever is pivoted to rock about the balance axis, and masses connected with the levers and regulator lever so that the masses move outward or inward by equal amounts when the regulator lever is rocked relative to the spoke.

With these and other features as objects in view, an illustrative form of practice is shown in the accompanying drawing, in which:

Fig. 1 is a general plan view of a conventionalized watch movement having a balance on which is provided a regulator arrangement according to this invention;

Fig. 2 is an enlarged plan view of the balance, with the regulator parts;

Fig. 3 corresponds to Fig. 2, but with the parts in a different position of adjustment;

Fig. 4 is a section substantially on broken line 4—4 of Fig. 3, and showing the position of the hairspring and its collet;

Fig. 5 is an edge view of a regulator lever;

Fig. 6 is an edge view of a mass-supporting lever.

In these drawings, the watch is shown in Fig. 1 as conventionally having a pillar plate PP, a balance cock BC, and plates P which support the pallet, escape wheel parts, train parts and the hands staffs. The balance cock BC carries a stud HSD to which is fixed the outer end of the spiral hairspring HS which at its inner end (Fig. 4) is connected to a collet HSC on the balance staff BS. The balance wheel BW has a rim and the diametrical spoke member or arm BA which is fixed on the staff BS. The arm BA has two holes 10, 11 which are diametrically opposed across the balance axis and at equal radial distances therefrom. The balance wheel rim is of strong and sturdy section, and illustratively has a bottom surface in which drill holes such as 40 may be provided during the course of adjusting the balance to poise and may be employed in determining the gross moment of inertia. In section, it has the flat bottom face 41 in a radial plane, the cylindrical outer surface 42, a cylindrical inner surface 43 between the connections of arm BA, and a beveled inner opposite face 44 extending toward the arm and upon which scale markings 21 can be clearly displayed.

Two identical mass-controlling levers 12, 13 are provided, having holes 14, 15 adjacent their ends; and preferably of curved shape, so that they can extend around the staff BS in the position of Fig. 3. A regulator piece 16 is symmetrical in mass and has a central hole 17 by which it is fitted on the balance staff (Fig. 4) for rocking relative thereto. The piece 16 has two identical, illustratively radial, slots 18, 19 and is provided at its ends with witness marks 20 which cooperate with scale division marks 21 on the balance wheel rim. The piece 16 also has a pair of diametrically opposed notches 22, adjacent its center, with circular edges 23 leading thereto. In the illustrated embodiment, it will be noted that the regulator lever 16 is located within a flange at the balance wheel rim, between the collet HSC and the arm BA, i. e. in a radial plane intersecting the beveled surface, so that the parts are compactly arranged and occupy no excessive space.

The mass-controlling levers 12, 13 are preferably of spring material, and in the unstressed condition are slightly concave upwards (Fig. 6); while the regulator lever 16 is of a like material and in unstressed condition (Fig. 5) has its ends slightly concaved downwards.

Pivot pieces 24, 25 are identical, and are received in the holes 10, 11 of the arm BA and the respective holes 15, of the two levers 12, 13. Each pivot piece has an enlarged end 27 which prevents it from moving through a hole 15; a central portion 28 with a close but movable fit in the hole 10 or 11 of the arm; and a groove 29 for receiving an edge 23 whereby the pivot piece is held in place.

The masses 31, 32 are identical, with a central body portion 33 which is larger than the width of the slots 18, 19, and than the holes 14 in the levers. Each mass has the reduced ends 34, 35 respectively adapted to fit closely in a slot 18, 19 or a hole 14. Such masses can be easily, quickly, and accuricately made in quantity; and their accuracy inspected by weighing and grouping into units of like weights. It is sometimes desirable for the assembler to have groups of such pairs, in which the groups comprise pairs which are like in mass but different in masses among the groups. Thus if a given balance exhibits an excessively "fast" or "slow" rate, the masses 31, 32 are removed and another pair of greater or lesser individual weight introduced. It may also be noted that by selecting the masses by weight, the values of adjustment by movement of a witness mark 20 opposite a scale 21 may be varied, say from one minute per day to four minutes per day for the total scale distance, wherewith the precision of original manufacture of a balance to a close tolerance of movement of inertia can be employed with small masses to attain very close regulation of rate in a fine watch; while with cheaper movements, larger masses are employed to compensate for greater errors of manufacture with a concurrent lesser precision of adjustment to time rate; noting also that a pair of balance screws can be introduced, preferably opposite the ends of the arm, if it is desired to employ relatively small masses 31, 32 for small adjustment changes per scale division.

The assembly can be made by forcing the arm BA onto the balance staff BS; assembling the levers 12, 13 on the arm BA by the pivot pieces 24, 25; moving the regulator piece 16 axially along the balance staff, with its notches 22 opposite the pivot pieces until the piece 16 comes against the arm BA and then rocking the piece 16 about the balance axis until the edges 23 enter the grooves 29; pressing the collet HSC into place; and finally springing the levers 12, 13 and the ends of the regulator piece apart and introducing the masses 31, 32 into position and permitting the levers and piece ends to return. The assembly with the regulator lever 16 on center or zero division of scale 21 as shown in Fig. 2 is then vibrated or timed to a frequency standard to obtain proper strength of hairspring.

This vibrated or timed assembly is then introduced into the watch movement. Often the rate will be in error, being too slow if the masses 31, 32 are originally too close to the balance wheel rim so that the radius of gyration or moment of inertia is too great for a given assembly; or conversely being too fast if the masses are too near the axis. The rate determination, for a given assembly, can be correlated to the division marks 21, so that a movement of the witness marks 20 relatively clockwise with respect to the rim in Fig. 2 by one division space will represent a gain of ten seconds per day for the assembly; thus, if the rate is thirty seconds slow during initial rating, the operator moves the regulator piece 16 clockwise relative to the arm BA until the witness marks 20 are opposite a scale position three spaces removed from the prior position. The rate is again determined, and a final minor adjustment can be made. If the lever is moved to one or the other end of the scale without effecting an accurate rating, the masses 31, 32 are removed and replaced by a lighter or heavier pair, as stated above.

The spring effects of the levers 12, 13 and the regulator piece 16 cause them to grip the masses 32, 33 and establish a friction which prevents accidental movement of the parts during the oscillation of the balance. It will be noted that lateral shocks do not shift the masses, as such shocks tend to move one mass and its lever relatively inward and the other relatively outward, and such contrary movements are prevented by the regulator piece.

It is preferred that the spacings of the pivots on the arm BA, the spacings of the holes in the lever arms and the length of the slots are such that when the regulator 16 is moved counterclockwise, the masses 32, 33 encounter the ends of the slots before the pivot pieces come opposite the notches. In this way, a disassembly is not caused if an operator incautiously moves the regulator, and its full stroke may be employed in determining the rate.

It is obvious that the invention is not restricted to the embodiment shown, but that it may be employed in many ways within the scope of the appended claims.

I claim:

1. A balance for a horological instrument, comprising a support, a system of masses individually movable relatively toward and from the balance axis, a regulator piece carried by the support and rotatable relative thereto about the balance axis and having slots directed radially relative to the balance axis, and levers pivotally mounted on the support at points eccentric to the balance axis and having holes spaced from the pivotal mountings, each mass having projections engaged in a lever hole and a regulator slot so that upon rotation of the regulator piece relative to the support concurrent movement of the masses are produced by swinging of each mass under control of its associated lever and regulator slot.

2. A balance for a horological instrument, comprising a support, a system of identical levers distributed around the balance axis and pivoted on the support at points on a circle spaced from and concentric with the axis, a regulator piece carried by the support and rotatable relative thereto about the balance axis and having slots radially directed relative to the balance axis, and mass elements with one mass element on each lever, said elements being spaced from the respective pivot points at identical distances by the said levers and engaged in a respective corresponding slot of the regulator piece so that the relative rotation of the regulator piece causes the levers to move simultaneously and effects concurrent movement of the centers of gravity of the levers and elements relative to the axis.

3. A balance for a horological instrument, comprising a support, a system of masses individually movable relatively toward and from the balance axis, a regulator piece carried by the support and rotatable relative thereto about the balance axis and levers pivotally mounted on the support and thereby held for pressing gainst the respective masses, each mass being pivotally connected to the said regulator piece and to a said lever for concurrent inward and outward movements of the masses and located between said regulator piece and the respective lever and engaged therewith, said levers being of spring material and concave for producing a detaining friction effect upon the masses in the assembly.

4. A balance for a horological instrument, comprising a support, a system of masses individually movable relatively toward and from the balance axis, a regulator piece carried by the support and rotatable relative thereto about the balance axis, and levers pivotally mounted on the support, the lever pivot connections to the support being effective for causing each lever to press its respective mass against the regulator piece, each mass being located between and pivotally connected to the said regulator piece and to a said lever for concurrent inward and outward movements of the masses, said lever and regulator piece being engaged with the respective said mass, said regulator piece being of spring material and concave for producing a detaining friction upon the masses in the assembly.

5. A balance for a horological instrument having an oscillating supporting member having holes, levers having holes, lever pivots having portions fitting holes in the supporting member and holes in the levers, an enlarged head at one end of each pivot, each said pivot having a groove adjacent the other end thereof, a regulator piece rockable about the balance axis and having slots directed radially relative to the balance aris, and masses carried by the levers and having projections each engaging a regulator slot whereby the levers and masses are concurrently moved when the regulator piece is rocked, the regulator piece having circular edge portions received in the said grooves.

6. A balance for a horological instrument, comprising a balance wheel rim and arm, said rim having a face in a radial plane and its opposed face being beveled toward the arm, a system of masses individually movable relatively toward and from the balance axis, a pair of levers individually pivoted on the balance arm at points eccentric to the balance axis, each lever being connected to a said mass at a point spaced from its pivot mounting, and a regulator piece located in a radial plane intersecting the beveled surface and extending to near said rim, said regulator piece being supported on the balance for rotation about the balance axis and having slots directed radially relative to the balance axis, each slot being engaged with a said mass so that upon movement of the regulator piece about the balance axis relative to the balance arm the levers are concurrently moved and the masses concurrently shifted toward or from the balance axis, said beveled surface having a scale thereon, said regulator piece having a witness mark on its extension for cooperation with said scale.

7. A balance as in claim 5, in which the said circular edge portions terminate at notches effective to permit passage of the end of the corresponding pivots and in which a lever is so dimensioned and has such pivot spacing, and the regulator piece has its corresponding slot of such a length that the corresponding said lever pivot engages the end of the slot before the said pivot comes opposite the notches.

8. A balance for a horological instrument, comprising a support, a system of masses individually movable relatively toward and from the balance axis, each mass having projections at its opposite ends, a regulator piece carried by the support and rotatable relative thereto about the balance axis and having slots radially directed relative to the balance axis and with each slot receiving a projection of a said mass, and a system of levers each pivoted on the support eccentric to the balance axis and each having a hole spaced from its pivot point for receiving another projection of a corresponding mass, said regulator piece and said levers having parts in contact with the respective mass for presenting friction areas to each mass adjacent the projections thereof whereby to prevent accidental shifting, said regulator piece being effective upon its relative rotation for moving the masses concurrently and therewith the levers whereby to vary the moment of inertia of the balance by shifting the respective centers of gravity concurrently by equal distances relative to the balance axis.

References Cited in the file of this patent

UNITED STATES PATENTS

| 762,682 | Butts | June 14, 1904 |

FOREIGN PATENTS

| 7,059 | Great Britain | 1904 |
| 16,676 | Switzerland | May 11, 1898 |
| 255,475 | Switzerland | Jan. 17, 1949 |
| 412,747 | France | May 10, 1910 |
| 980,942 | France | Jan. 10, 1951 |